Feb. 29, 1944.   R. E. HANSEN   2,342,858
STAMPING APPARATUS
Filed March 17, 1941   2 Sheets-Sheet 1
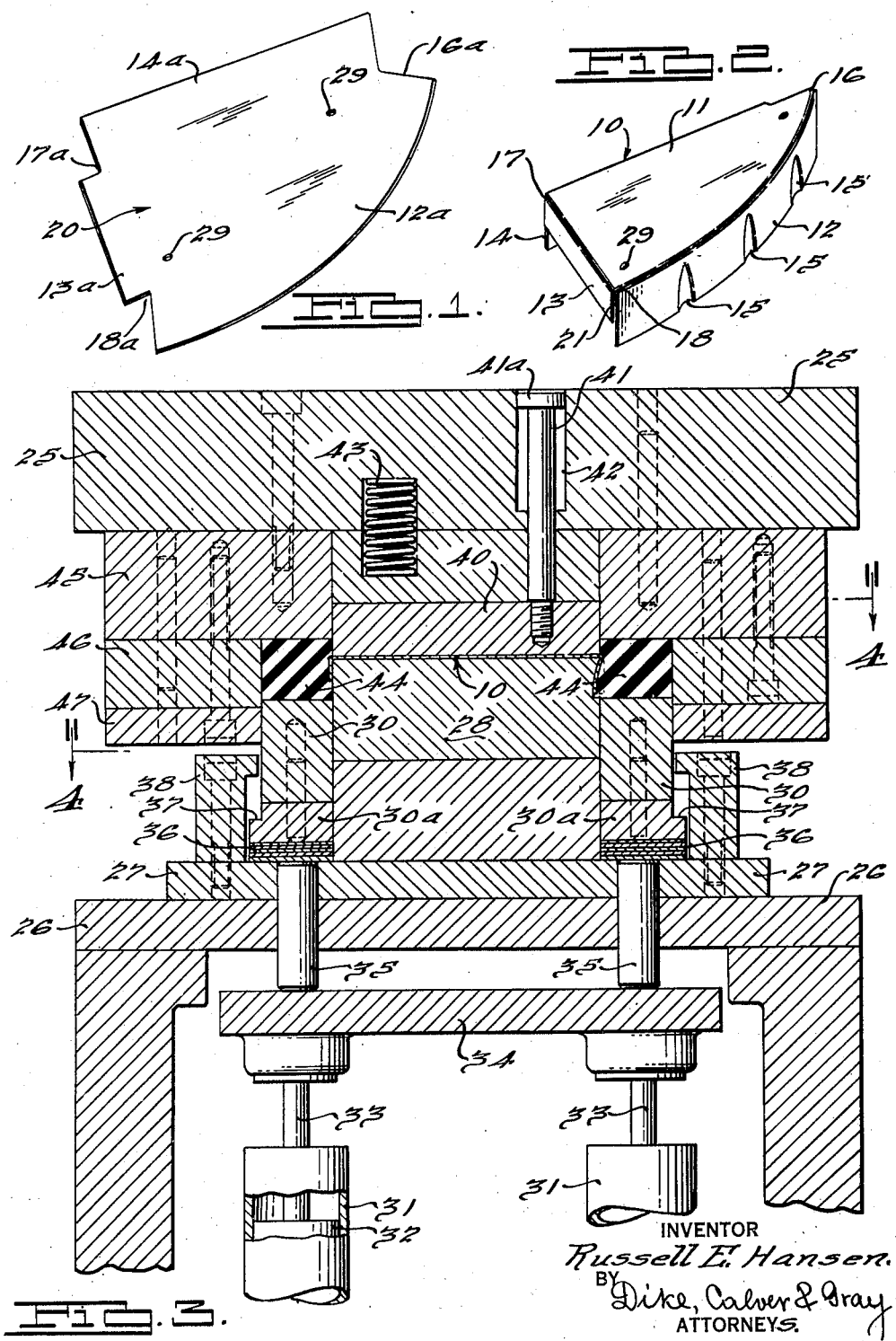

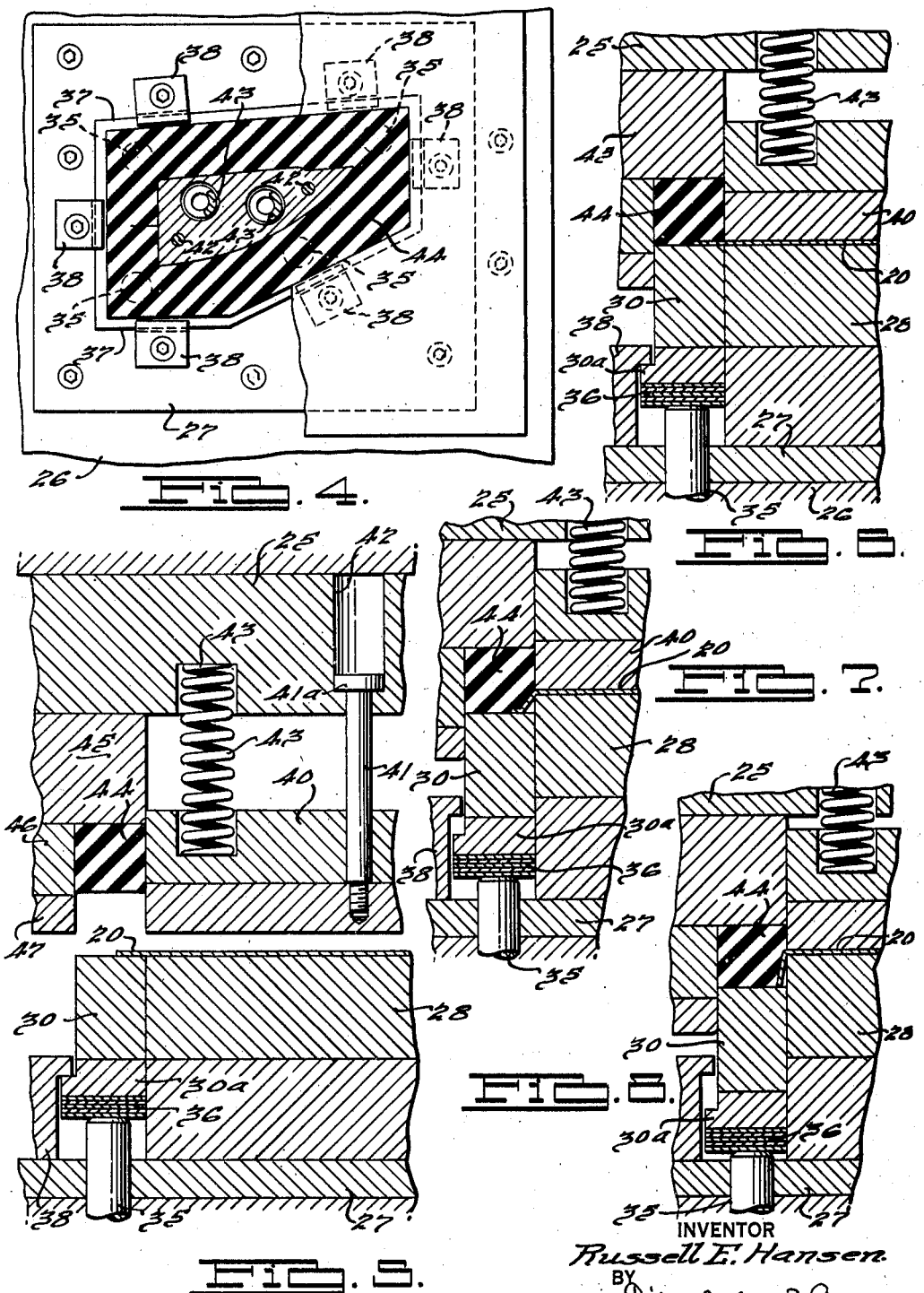

Patented Feb. 29, 1944

2,342,858

UNITED STATES PATENT OFFICE 2,342,858

STAMPING APPARATUS

Russell E. Hansen, Detroit, Mich., assignor to Hudson Motor Car Company, Detroit, Mich., a corporation of Michigan Application March 17, 1941, Serial No. 383,683

6 Claims. (Cl. 113—44)

This invention relates to apparatus for stamping, forming or otherwise performing operations upon sheet material, particularly sheet metal, the invention especially relating to apparatus wherein there are utilized blank pressing or operating parts made of a resilient material such, for instance, as rubber.

It is commonly known that rubber is usually soft and pliable, and that it yields to pressure very easily. It is also well appreciated in the art that the softness of rubber is conditioned upon rubber being permitted, when subjected to pressure in one direction, to flow or "bulge" in other directions. On the other hand, when subjected to compression in a rigid enclosure rubber is substantially incompressible, and the volume thereof cannot be appreciably reduced by increasing the pressure thereon. In other words, in rigid compression rubber exhibits characteristics similar to those observed in cases of liquids and, therefore, very high unit pressures may be attained within the rubber mass without appreciably decreasing the volume thereof.

Appreciation of the above described phenomenon has resulted in the utilization in the stamping art of die devices including rubber members. Generally such devices comprise a stationary blank supporting die and a movable punch carrying a rubber member adapted at the end of the working stroke of the punch to come into contact with the blank and to exert bending pressure thereon. Earlier devices of this general character permitted the rubber to flow or bulge to the sides while exerting stamping pressure on a blank, in consequence whereof the operative pressures which could be produced by the rubber member have been very low, thereby permitting successful stamping of only relatively thin or soft materials. In later devices of this general character means were provided to confine the rubber in a rigid enclosure and compressing it therein for exerting pressure on the blank and thus to force portions of the blank into the various depressions provided in the die. Devices of the latter type proved to be useful in some particular instances but their wider application has been limited by the fact that such devices depended entirely upon the "liquid" flow of confined rubber, which is to say distortion of the mass thereof, for stamping operations. Although the elastic limit of rubber is such that very high strains are attainable, still there is a definite limit beyond which rubber cannot be strained without permanent injury thereto. With the harder rubber that has had to be used for stamping thicker metals this limit is relatively low. In forming operations where distortion of the blank, in order to provide wide flanges or deep draws, takes place through a distance of several inches, use of such devices has proved impractical, since rubber suitable for use in such devices cannot be called upon to flow through such distances without rupture. Therefore, conventional metal dies have heretofore been depended upon for forming operations, while rubber die members have been used either for very thin sheets or, in cases of thicker sheets or deeper draws, simply as inserts in the conventional punches to form finally some portions of the blank at the end of the forming stroke of the die punch.

A still further object of the present invention is to provide an improved die device including a stamping member made of a resilient material, such as rubber, which member is capable of forming in a single operation deep draws and/or wide flanges in the metal blank.

Another object of the present invention is to provide an improved die device having a stamping member made of rubber, said member being capable of exerting forming pressure on the blank throughout substantially the entire pressure applying portion of the working stroke of the die punch.

A further object of the present invention is to provide an improved die device including a stamping member made of rubber, which is adapted to exert stamping pressure on the blank while being moved bodily.

A still further object of the invention is to provide an improved die device including a rubber stamping or blanking member adapted to be compressed for exerting stamping, forming or blanking-out pressure on a blank and to pass in the process of such compression through two pressure stages: one produced by yielding pressure and the other produced by non-yielding pressure on rigidly confined rubber mass.

A still further object of the invention is to provide an improved die device having a rubber stamping member adapted to operate on a blank in two stages occurring successively during a single working stroke: first while being yieldingly compressed and moved bodily, and thereupon while being non-yieldingly compressed in a bodily stationary rigid enclosure.

A still further object of the present invention is to provide an improved die device having a stamping member moved bodily while exerting forming pressure on the blank, said member being adapted to act successively in two directions during a single working stroke.

A still further object of the invention is to provide an improved die device of the character specified in the preceding paragraph which in addition to successive application of force in two directions during the working stroke also exerts blank removing force on its return stroke.

A still further object of the invention is to provide an improved die device for performing forming operations on sheet metal blanks, in which device there are provided metal means for holding the blank, and rubber means for effecting the forming operation proper while the blank is so held.

A still further object of the invention is to provide an improved die device including blank contacting operative parts made of materials such as rubber, which parts are adapted to be put in compression in closed chambers and to exert pressure such as is exerted by a liquid under compression on the stamped blank, means being provided to vary adjustably the volume of the closed chambers at the end of the working stroke of the die parts, and thereby to adjust the maximum pressure to be exerted by the rubber, or a similar material, on the blank.

It is an added object of the present invention to provide an improved structure of the foregoing character which is simple in construction, dependable in operation and is relatively inexpensive to make.

Other objects of this invention will appear in the following description and appended claims, reference being had to the accompanying drawings forming a part of this specification wherein like reference characters designate corresponding parts in the several views.

Fig. 1 is a perspective view of a flat blank from which the workpiece or article is intended to be formed in a die device embodying the present invention.

Fig. 2 is a perspective view illustrating the workpiece as it comes from the die.

Fig. 3 is a transverse vertical section taken through the die device and portions of the press, said view illustrating the arrangement of the operative parts of the device embodying the present invention.

Fig. 4 is a sectional view taken in the direction of the arrows on the section plane passing through the broken section line 4—4 of Fig. 3.

Fig. 5 is a sectional view of a portion of the die device illustrating the beginning of the stamping operation, the blank of Fig. 1 being shown in its operative position before it is contacted by the punch parts.

Fig. 6 is a view similar in part to Fig. 5 illustrating the relative positions of the die device parts at the moment when the rubber die member commences its forming or bending operation on the blank.

Figs. 7 and 8 illustrate respectively the next two successive steps of the forming operation.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is shown by way of example a die device embodying the present invention. The die device herein illustrated and described is adapted for forming a workpiece or article shown in Figs. 1 and 2. It will be understood, however, that the invention is not limited to specific details of construction necessitated by the particular shape of the article to be stamped or formed, but it may be successfully applied for stamping or forming workpieces or articles of different forms and description. In describing the die device herein disclosed the same is presumed to be so arranged that the punch moves vertically, and therefore certain portions of the die device or press will be referred to as being disposed above or below others. It will be distinctly understood, however, that such terms are used for the purposes of description and not of limitation, and that the entire die device may be arranged in such a manner that the punch moves in directions other than vertical, such for instance as horizontally or along an inclined path.

Fig. 2 illustrates in perspective the finished workpiece intended to be pressed from a blank illustrated in Fig. 1 in the die device herein illustrated and described. Referring to Fig. 2, said article generally indicated by the numeral 10 comprises a substantially flat portion 11 having at its edges flanges 12, 13 and 14. The flanges 12, 13 and 14 extend transversely to the plane of the flat portion 11, and in the present instance they are substantially perpendicular to said portion 11. On the curved side flange 12 there is provided a number of indentations 15 extending transversely to the plane of the flange 12. The corners 16, 17 and 18 of the flat portion 11 are relatively sharp and therefore the portions of the blank illustrated in Fig. 1 and generally indicated by the numeral 20 are cut out as indicated at 16a, 17a and 18a in order to prevent formation of an excessive number of wrinkles in the process of forming because of forcing a considerable mass of sheet metal into a greatly reduced area. Because of cut out corners, the flanges 12, 13 and 14 of the article 10 are separated from each other by slits such as indicated at 21. If, however, it is desirable to form flanges on an article without slits such as 21, extending around the entire flat portion of the article and merging into each other, it would be necessary to provide a sufficient radius at each of the sharp corners of the article.

It will now be understood that in view of the above description of the article, when the same is formed in a conventional die having metal operating parts it is necessary to form flanges 12, 13 and 14 by a downwardly moving metal member. It has been found that formation of relatively deep flanges such as those illustrated herein is accompanied by formation of wrinkles producing exceedingly high localized pressures on portions of the metal sheet, which wrinkles remain in the finished article and produce scored portions. In addition, for forming indentations such as 15 or some kind of ornamental design, holes or other elements on the depending flanges, it is necessary to form the same by a separate member moving transversely of such flanges. If it is necessary to form such indentations around the entire flat portion it is necessary to provide a number of special members usually actuated by various cams moved by a wedging action of the punch. The dies of such a construction are exceedingly complicated and are difficult to make since they require exceedingly close fitting of their mating parts.

Forming workpieces such as 10 with the use of conventional dies with rubber inserts has also heretofore been considered impractical since in such dies the rubber member would commence its forming operation substantially at the end of the working stroke of the punch and the rubber would have to flow all the way down for forming flanges and indentations thereon. In other words, the entire forming operation would be performed by the mass flow of the rubber member. The flow of the rubber mass and particularly of harder rubber through such distances cannot be effected without rupture of the rubber or without causing deterioration thereof after a few strokes.

In accordance with the invention, means are provided whereby flanges 12, 13 and 14 of the workpiece are formed by a rubber member operating in two stages. In the first stage of operation the rubber member is resiliently confined in an enclosure which moves bodily along a substantial portion of the working stroke which is necessary for the formation of such deep flange or draw. When such flanges are substantially formed by the downward pressure of the rubber member moving while being yieldingly confined, the enclosure confining the rubber member is stopped in its downward motion and the rubber is rigidly compressed therein. This causes flow of the rubber mass in all directions including the direction perpendicular to the flange and exerting rigid pressure on the blank in the process of which all desired indentations extending transversely or perpendicularly to the depending flanges are formed. Thus instead of a conventional method of forming portions of a blank by a mass flow of a rubber member rigidly confined at the end of the working stroke of the punch, my improved method contemplates the forming of portions of the blank with the use of a rubber punch member, first by subjecting said rubber member to yielding compression and moving it bodily through a distance necessary to form such flanges or draws, and thereupon confining said rubber member rigidly and compressing it for producing final forming pressure on the blank, which pressure acts in all directions.

The above described process may be carried out with the aid of a number of various devices and apparatus. One of such devices embodying the present invention is illustrated in Figs. 3 to 8, inclusive. Referring to said figures, and particularly to Figs. 3 and 4, the die device illustrated therein is adapted for attachment to any press having a movable ram 25 and a stationary die table 26. On the table 26 there is secured a bolster plate 27 which is adapted to support a die plate 28 which may be made in a plurality of die plate sections as herein illustrated. The die plate 28 is adapted to receive and support the blank 20 during the stamping operation, and in its shape said plate 28 is made substantially coextensive with the flat portion 11 of the article 10. Thus when the blank 20 is operatively arranged on the plate 28, which may be accurately done with the aid of locating pins (not shown) entering holes 29 of the blank, the flat portion 11 is supported by the die plate while the portions 12a, 13a and 14a of the blank 20, which portions are intended to be formed into flanges 12, 13 and 14 respectively, extend outwardly from said die plate 28, and are supported by a vertically movable pressure pad 30 adapted in its free position to extend flush with the die plate 28 as shown in Fig. 5. The supporting member or pressure pad 30 is extended all the way around the supporting plate 28 in the form of a ring and is adapted to move from its uppermost position shown in Fig. 5 downwardly to the position indicated in Fig. 3. The member 30, which may be termed the lower pressure pad, is adapted to yield to the forming pressure on the flange portions 12a, 13a and 14a of the blank 20, while the die plate 28 is stationary and is adapted to support the portion 11 rigidly.

Means tending to maintain the pressure pad 30 in its uppermost position are, in the present embodiment of the invention, of pneumatic character. Referring to Fig. 3, said means represent a plurality of air cylinders 31 with a piston 32 having a piston rod 33 slidably fitted in each of said cylinders. The piston rods 33 support a pressure plate 34 contacted by a plurality of pins 35 passing through a number of holes provided in the die table 26 and the bolster plate 27 and contacting the pressure pad 30, a plurality of shims 36 being interposed between said pins 35 and member 30. The member 30 is made in two sections as illustrated in the drawings and the bottom section 30a thereof is provided with a shoulder 37 adapted to contact the inwardly extending portions of the hook members 38, a plurality of which are secured to the bolster plate 27 around the pad 30 as is best illustrated in Figs. 3 and 4. By virtue of the provision of said hook members 38 the pressure pad 30, which is pushed upwardly by the pistons 32 through piston rods 33, pressure plate 34 and pins 35, is stopped in its upward or return stroke in a position illustrated in Figs. 5 and 6 wherein the top surfaces of both the supporting die plate 28 and the pressure pad 30 are flush or co-planar with each other, thus forming in effect a single articulated plate having rigid portions and yielding portions. Thus, the operative stroke of the lower pressure pad 30 is determined at its upper extremity by the hook members 38 and at its lower extremity by the bolster plate 27 and the shims 36. By taking out or adding shims 36 the lower extremity of the operative stroke of the member 30 may be adjustably varied.

The punch of the die device connected to the movable ram 25 of the press is adapted to come in contact with the die including the plate 28 and the member supporting the blank 20 and to exert stamping pressure thereon for forming portions of the blank. The punch comprises a spring pressure pad 40 connected to the ram 25 with the aid of screw guide pins 41, the heads 41a whereof are adapted to slide in holes 42. A plurality of springs 43 interposed between the ram 25 and pressure pad 40 in suitable nests are adapted unless overcome by greater force to maintain the pressure pad 40 in its extended position as is best illustrated in Fig. 5. The lower extremity of said position is determined by the depth of the holes 43 and the heads 41a of the guide pins 41, while in its uppermost position the pressure pad 40 contacts the ram plate 25. It will now be understood that in view of the foregoing when the ram plate 25 moves downwardly the pressure pad 40 contacts the blank 20 first and by exerting pressure thereon produced by the springs 43 it holds the blank 20 against the supporting plate 28.

Means exerting forming pressure on the portions of the blank 20 intended to be formed into flanges are exemplified in the present embodiment of the invention by a rubber die or forming member 44 carried by the punch. The rubber die 44 is arranged in a recess or chamber which is formed by the yielding pressure pad 40, the non-yielding depending plate 45, the spacer plate 46 and the die retaining plate 47. The plates 46, 47 are rigidly fixed together and to the plate 45 which in turn is fixed to the punch 25. The spacer and die retaining plates 46, 47 are shaped to telescope over the lower pressure pad 30 and snugly embrace the same during the forming operation. The chamber formed between the yielding and non-yielding portions of the punch is adapted to house the rubber die member 44, this chamber being open in the upper position of the punch at its lower side facing the die pad 30. It should be noted that plates 45, 46 and 47 although made separate in the present embodiment, may be made integral with each other as well as with the punch plate or shoe 25. However, it is pointed out that making them in sections greatly facilitates manufacture and assembly of the die apparatus as well as adaptation to various requirements and operations.

Fig. 5 illustrates the relation of the parts of the apparatus at the commencement of an operation. As shown in said figure, the punch is in its uppermost position with the pressure pad 40 in its fully extended position. The lower pressure pad 30 is in its uppermost position and the upper surface thereof is flush with the upper surface of the die plate 28, and said plate 28 and the member 30 support the blank 20. As the punch moves downward the upper pressure pad 40 first contacts the blank 20 to clamp or hold the same, and upon still further downward movement of the punch the rubber forming member 44 contacts the marginal portions of the blank 40 intended to be formed into flanges. This latter movement of the rubber die member 44 into blank contacting position is accompanied by an upward movement of the upper pressure pad 40 against the action of springs 43. It is to be noted that the rubber die member 44 is substantially coextensive with the lower pressure pad 30 and is arranged in registering position therewith. Therefore, as the downward pressure of the ram continues the rubber forming member 44 presses on the flanged portions of the blank and the lower pressure pad 30. The ring structure 46, 47 telescopes over the lower die pad 30 prior to engagement of the rubber die with the blank. The rubber mass is compacted into somewhat smaller volume during initial pressure transmitted from the ram until the resistance of pad 30 is overcome. The rubber is fully confined as shown in Fig. 6 when the bending operation commences.

As the lower pressure pad 30 moves downward, yielding to the pressure of the rubber member, the flange portions are bent downward, being resiliently but firmly held to the pressure pad 30 as shown in Fig. 7. The process of such forming of the flanges continues as is illustrated in Fig. 8. It can now be easily seen from an examination of Figs. 5 to 8, inclusive, that forming of the flanges on the blank 20 is effected with the aid of the rubber forming member 44 which is bodily moved downwardly through a substantial portion of the working stroke of the punch while being resiliently confined or enclosed in the chamber formed by the rigid and yielding portions of the punch. Since the lower pressure pad 30 is pneumatically pressed against the rubber die member the compression of the rubber mass is yielding. By proper selection of the air pressure in the cylinders 31 any desired predetermined degree of yielding compression of rubber may be attained.

As the pressure pad 30 reaches the end of its downward stroke, it becomes rigidly supported by the bolster plate 27 which constitutes, together with shims 36, a rigid stop for said member 30. Under such conditions continued pressure of the punch on the rubber member operates to compress the rigidly confined rubber mass and produce exceedingly high pressure in the rubber which as has been explained above is substantially incompressible. In consequence of producing such high pressure the mass flow of the rubber begins in all directions including that perpendicular to the plane of the flanges, whereupon any indentations such as 15 may be formed by pushing portions 15 of the flanges into similar shaped cavities formed on the outer vertical edge of the die plate 28.

Upon the completion of the forming operation the punch commences its upward or return stroke. As soon as the punch begins moving upwardly the internal pressure in the rubber mass is relieved and the rubber flows back out of the depressions or holes perpendicular to the depending flanges and the entire rubber member moves upwardly with the punch. Because of the pneumatic support of the die pad 30 the same follows the rubber member upwardly and the friction of the rubber on the flanges or pressure of the lower die pad thereon moves the workpiece upwardly. Therefore, when the punch reaches its uppermost position and the die or pressure pad 30 comes flush with the top of the supporting die plate 28, the finished article may be easily removed from the die device in any suitable manner whether manual or automatic.

There are thus provided an improved method and an improved die apparatus whereby it becomes possible to form or otherwise operate upon the blank with the aid of die devices including rubber members, various articles including deep flanges and draws on which there also may be provided various designs, indentations or the like. Such forming operations are produced without causing the rubber to flow through excessively large distances which would be dangerous for the rubber. It will be understood that in lieu of forming indentations or the like by the transverse pressure of the rubber, other operations such as shearing, cutting or punching may be accomplished.

From the above description it will be seen that there is provided an apparatus and method whereby a portion of the blank is first clamped rigidly and another portion yieldingly gripped between two members, such as a rubber member and a pressure pad, whereupon the two members are bodily moved in unison relative to the clamped portion of the blank to form or bend the portion of the blank gripped between the rubber member and pressure pad.

It is important to note that in the present construction there is provided a yieldable pressure pad 40 adapted to clamp the work or blank 20 on that surface of the fixed die 28 which faces the pressure pad. As illustrated particularly in Fig. 5, the movable die 25 overlies the pressure pad 40 and in addition has members or portions 45, 46 and 47 which extend downwardly at the sides of the pressure pad and are constructed to provide a recess extending around the pressure pad and within which is confined a rubber ring-like member 44. Thus, as a result of this construction the rubber member is snugly confined at three sides between the pressure pad and the movable die portions 45 and 46, as clearly shown in Fig. 5. This rubber member 44 is in the nature of a shaping ring or member adapted to cooperate with the fixed die 28 to shape or flange down the marginal edge of the blank or workpiece 20 when the dies are moved relative to each other. As illustrated in Fig. 6, the rubber ring or member 44 surrounds the pressure pad 40 and extends contiguously along the sides of the pressure pad in the operative position of the parts. The rubber member 44 also surrounds or extends contiguously along the sides of the fixed die 28 when the dies are moved relative to each other in the manner shown in Figs. 3, 7 and 8.

In addition to the foregoing construction, it will be noted also that there is provided a cushion ring or member 30 which extends around the fixed die 28 and is coextensive with the rubber member 44. This cushion member or ring presses the rubber ring 44 and the marginal portion of the work blank when the dies are in the operative position shown in Fig. 6 and also during relative movement of the dies as shown in Figs. 7 and 8. It will be seen that when the movable die 25 travels downwardly, the cushion ring or member 30 is adapted to be received in the recess about the fixed die as the rubber member is pressed by the cushion member. Thus, the compression of the rubber confined in the recess, due to the operative action of the movable die and cushion ring 30, serves to complete the shaping of the work blank against the contiguous portions of the fixed die 28.

In addition to the foregoing, it is important to note that the movable die 25 during operation has a predetermined stroke. However, when the plunger 35 bottoms, there is provided a stop which limits the downward movement of the cushion member or ring 30 so that slight continued movement of the movable die to complete its stroke causes compression of the rubber member in the recess, thereby enabling applicant to form or shape inwardly directed portions 15 in the flange 12 of the blank, as clearly illustrated in Fig. 3.

I claim:

1. A die apparatus comprising a fixed die, a movable die cooperating with the fixed die and having associated therewith a yieldable pressure pad adapted to clamp the work on the surface of the fixed die facing said pressure pad, said movable die having a recess therein, a rubber ring member confined in said recess constituting a shaping ring for cooperating with the fixed die to shape the marginal portion of the work when the dies are moved relative to each other, said rubber ring surrounding the pressure pad in the operative position of the parts and surrounding the fixed die upon movement of the dies relative to each other, and a cushion ring surrounding the fixed die and pressing said rubber ring and the marginal portion of the work when the dies are in operative position and during relative movement thereof, said cushion ring adapted to be received in said recess about the fixed die when the movable die is moved relative to the fixed die, and the rubber ring is pressed by the cushion ring, the compression of the rubber confined in the recess serving to complete the shaping of the work against the contiguous portions of the fixed die.

2. A die apparatus comprising a fixed die, a movable die cooperating with the fixed die and having associated therewith a yieldable pressure pad adapted to clamp the work on the surface of the fixed die facing said pressure pad, said movable die having a recess therein, a rubber member confined in said recess constituting a shaping member for cooperating with the fixed die to shape the marginal portion of the work when the dies are moved relative to each other, said rubber member extending around a plurality of sides of the pressure pad in the operative position of the parts and extending around corresponding sides of the fixed die upon movement of the dies relative to each other, a cushion member extending around corresponding sides of the fixed die and pressing said rubber member and the marginal portion of the work when the dies are in operative position and during relative movement thereof, said cushion member adapted to be received in said recess about the fixed die when the movable die is moved relative to the fixed die and the rubber member is pressed by the cushion member, the compression of the member confined in the recess serving to complete the shape of the work against the contiguous portions of the fixed die.

3. A die apparatus comprising a fixed die, a movable die cooperating with the fixed die and having associated therewith a yieldable pressure pad adapted to clamp the work on the surface of the fixed die facing said pressure pad, said movable die having a recess therein, a rubber ring member confined in said recess constituting a shaping ring for cooperating with the fixed die to shape the marginal portion of the work when the dies are moved relative to each other, said rubber ring surrounding the pressure pad in the operative position of the parts and surrounding the fixed die upon movement of the dies relative to each other, and a cushion ring surrounding the fixed die and pressing said rubber ring and the marginal portion of the work when the dies are in operative position and during relative movement thereof, said cushion ring adapted to be received in said recess about the fixed die when the movable die is moved relative to the fixed die, and the rubber ring is pressed by the cushion ring, said movable die having a predetermined stroke during operation of the apparatus, and means for limiting the movement of the cushion member before completion of the stroke of the movable die whereby continued movement of the movable die to complete its stroke causes compression of the member confined in the recess serving to complete the shaping of the work against the contiguous portions of the fixed die.

4. A die apparatus comprising a fixed die, a movable die cooperating with the fixed die and having associated therewith a yieldable pressure pad adapted to clamp the work on the surface of the fixed die facing said pressure pad, said movable die having a recess therein, a rubber member confined in said recess constituting a shaping member for cooperating with the fixed die to shape the marginal portion of the work when the dies are moved relative to each other, said rubber member extending around a plurality of sides of the pressure pad in the operative position of the parts and extending around corresponding sides of the fixed die upon movement of the dies relative to each other, a cushion member extending around corresponding sides of the fixed die and pressing said rubber member and the marginal portion of the work when the dies are in operative position and during relative movement thereof, said cushion member adapted to be received in said recess about the fixed die when the movable die is moved relative to the fixed die and the rubber member is pressed by the cushion member, said movable die having a predetermined stroke during operation of the apparatus, and means for limiting the movement of the cushion member before completion of the stroke of the movable die whereby continued movement of the movable die to complete its stroke causes compression of the member confined in the recess serving to complete the shaping of the work against the contiguous portions of the fixed die.

5. A die apparatus comprising a fixed die, a movable die cooperating with the fixed die, a yieldable pressure pad associated with said movable die and adapted to clamp the work on the surface of the fixed die facing said pressure pad, said movable die having a recess therein, a rubber member confined in said recess constituting a shaping member for cooperating with the fixed die to shape the marginal portion of the work when the dies are moved relative to each other, said rubber member extending contiguously along at least one side of the pressure pad in the operative position of the parts and extending along the corresponding side or sides of the fixed die upon movement of the dies relative to each other, and a cushion member coextensive with said rubber member and extending along the corresponding side or sides of the fixed die and pressing said rubber member and the marginal portion of the work when the dies are in operative position and during relative movement thereof, said cushion member adapted to be received in said recess contiguous with the fixed die when the movable die is moved relative to the fixed die and the rubber member is pressed by the cushion member, the compression of the member confined in the recess serving to complete the shaping of the work against the contiguous portions of the fixed die.

6. A die apparatus comprising a fixed die, a movable die cooperating with the fixed die, a yieldable pressure pad associated with said movable die and adapted to clamp the work on the surface of the fixed die facing said pressure pad, said movable die having a recess therein, a rubber member confined in said recess constituting a shaping member for cooperating with the fixed die to shape the marginal portion of the work when the dies are moved relative to each other, said rubber member extending contiguously along at least one side of the pressure pad in the operative position of the parts and extending along the corresponding side or sides of the fixed die upon movement of the dies relative to each other, and a cushion member coextensive with said rubber member and extending along the corresponding side or sides of the fixed die and pressing said rubber member and the marginal portion of the work when the dies are in operative position and during relative movement thereof, said cushion member adapted to be received in said recess contiguous with the fixed die when the movable die is moved relative to the fixed die and the rubber member is pressed by the cushion member, said movable die having a predetermined stroke during operation of the apparatus, and means for limiting the movement of the cushion member before completion of the stroke of the movable die whereby continued movement of the movable die to complete its stroke causes compression of the member confined in the recess serving to complete the shaping of the work against the contiguous portions of the fixed die.

RUSSELL E. HANSEN.